Dec. 24, 1940.  J. B. FREAR  2,226,373
TRANSPORTATION OF MERCHANDISE
Filed March 4, 1939
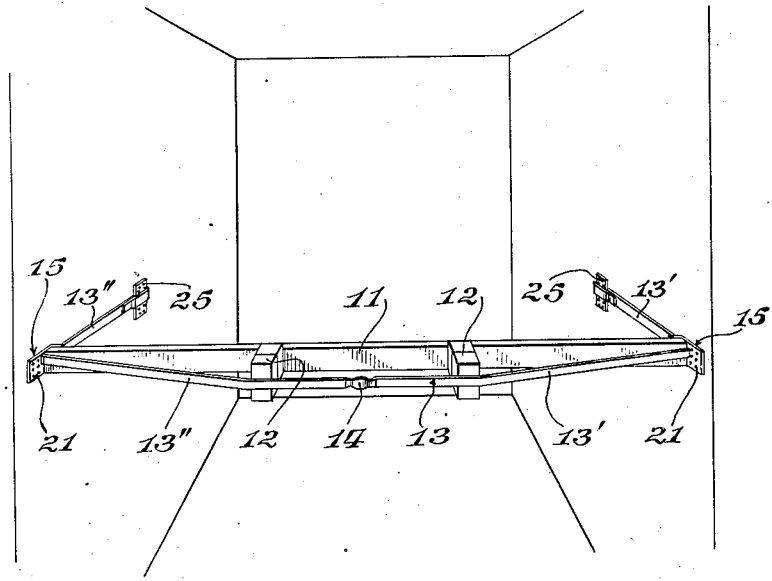
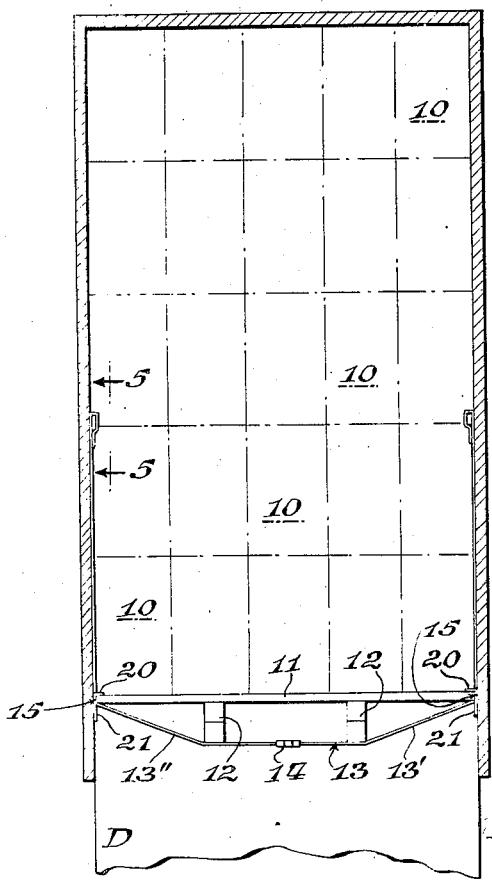
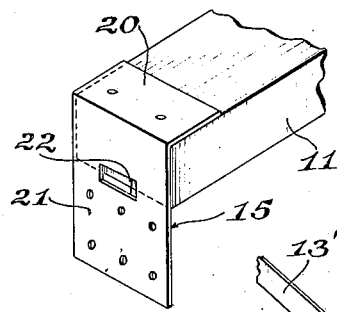
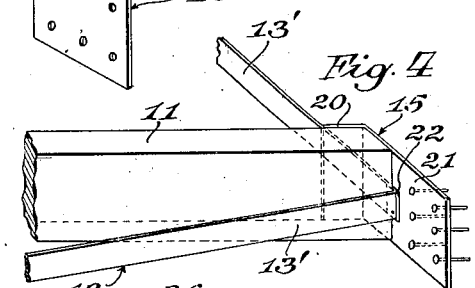
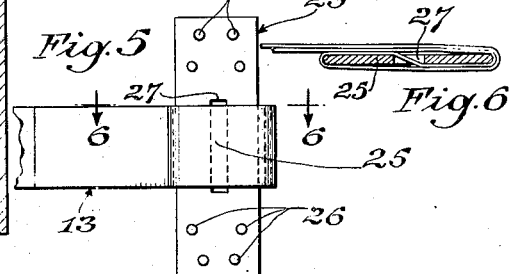
Inventor:
Jenness B. Frear
By Williams, Bradbury, McCaleb + Hinkle
Attys.

Patented Dec. 24, 1940

2,226,373

UNITED STATES PATENT OFFICE 2,226,373

TRANSPORTATION OF MERCHANDISE

Jenness B. Frear, Caruthersville, Mo., assignor to Signode Steel Strapping Company, Chicago, Ill., a corporation of Delaware Application March 4, 1939, Serial No. 259,754

4 Claims. (Cl. 105—369)

My invention relates to the transportation of merchandise in relatively fragile containers, such as crates, light boxes and the like, and also pressed sheet metal articles in bulk (i. e., not boxed or crated), such as automobile fenders, radiator shells, hook panels and the like.

Heretofore it has been the general practice to fill the ends of a box car with, for example, the crates and then between the car doorways to brace the crates into the car ends by either of the following two methods: By braces extending between the groups of crates occupying the two ends of the car; or by cross-pieces which extend from side to side of the car at the doorway ends of the load groups,—such cross braces being secured at opposite ends to the side walls of the car and usually having either no reinforcement intermediate their ends or braces extending diagonally from some intermediate point down to the car floor or over to a side wall. It has also been the practice to compress the load into the ends of the car by gates or bulkheads, the pressure of which against the full faces of the load units (i. e., from side to side of the car) is proportional to the force with which the gates or bulkheads were finally pushed or drawn against the load units.

These arrangements for securing the load are open to several objections. Braces extending between the groups of crates occupying opposite ends of the car (i. e., bracing the load at one end of the car by and against the load in the other end of the car) causes the forces of impacts (or at least the longitudinal components of such forces) to cumulate for the entire load against the crates in the end regions. Fragile crates, boxes and the like may not be able to withstand these crushing forces. Braces which extend across the car from side to side without intermediate reinforcement tend to bend and consequently do not uniformly distribute either the forces for compactly holding together the crates constituting a group or unit or the forces imparted to the load by impacts. By the use of gates or bulkheads which, throughout the application of the load clamping forces, are free to move, the outer forward corners of units made up of fragile components, such as cardboard crates, are apt to be subjected to excessive crushing strains before the central regions of the load units are adequately clamped in position.

Intermediate reinforcing bracing requires space and extra labor and material and has, moreover, proven unsatisfactory. Both methods require a considerable amount of bracing material; both consume a great deal of time in loading and unloading; and both are rather unreliable.

Shipment of such fragile containers and light, relatively thin, shaped articles by the so-called shifting load method (i. e., where groups of articles are bound together in more or less freely movable units by tightly tensioned flexible binders thereabout) frequently is not feasible because the pressure exerted by binders sufficiently tight to make the method practicable will be more than the containers can withstand,—particularly at the corners of the units. And formed sheet metal articles shipped in bulk, such as automobile fenders and the like, frequently need to be supported in successive horizontal layers of moderate weight, which is not practicable in shifting load methods.

One of the objects of my invention is to provide an improved method or arrangement for shipping in box cars fragile containers such as light crates and boxes and relatively fragile articles of the character heretofore mentioned.

Another object is to provide a load that will effectively hold the load groups in place without injury from excessive pressure, either in preparing the load or during transit.

Another object is to provide an effective load that may be relatively quickly and inexpensively prepared for transit and for unloading at destination.

Other objects and advantages will hereinafter appear.

The invention will be explained in connection with a typical load of rectangular crates which is illustrated in the accompanying drawing wherein:

Fig. 1 is a perspective of one end of a box car with my improved load bracing equipment in place, the crate load, however, being omitted in order not to obscure any of the parts;

Fig. 2 is a top plan of the same end of the car indicating the load therein and showing the relation thereto and to the car walls of my improved bracing equipment;

Fig. 3 is an enlarged perspective of one end of a bracing cross-beam with what I term a reaction bracket applied thereto;

Fig. 4 is a view showing in detail the relation between the ends of the cross-beam, the reaction bracket and the binder;

Fig. 5 is a plan view of a preferred form of binder anchorage, and

Fig. 6 is a section on the line 6—6 of Fig. 5.

Fig. 2 shows a typical load group or unit of rectangular crates 10 filling one end of a box car substantially up to the line of the doorway space which is indicated by the letter D. The crates are indicated by dotted lines so as to avoid confusion with the various elements of the bracing structure. Ordinarily, in order to prevent individual shifting under the impacts of switching and travel, the crates should be so arranged and related as quite completely and compactly to fill the space to be occupied by the group or unit.

Across the front (i. e., the doorway end) of the unit there extends a cross-beam 11 from side to side of the car,—the beam being preferably of wood. The opposite ends of this cross-beam are anchored to the car walls in some appropriate manner and at a height which will effectively counteract any tendency of the crates to tilt,— preferably somewhat above the vertical center. In the mid region of the cross-beam 11 there are one or more (two are shown) struts 12 which project outwardly or forwardly (i. e., toward the doorway) therefrom. These struts may be blocks of wood nailed or otherwise secured to the front face of the cross-beam.

The bracing structure—it may be termed a gate—is completed by a tension member 13 such as a flexible steel strap or wire which has its opposite ends appropriately anchored to the opposite car walls behind the cross-beam and its intermediate portion trained along and in front and in the plane of the cross-beam and against the outer ends of the struts. The binder 13 comprises two sections 13' and 13", each of which has one end anchored to the car wall behind the cross-beam 11 and the other ends of which are united by a suitable tension-resisting joint 14.

Figs. 3 and 4 show a convenient and effective reaction-bracket or clip 15 for attaching the ends of the cross-beam 11 to the car walls and for providing a passageway over the end of the cross-beam for the tension member 13. Such a bracket or clip may be cut from a flat piece of sheet metal bent, either before or after application to the end of the cross-piece, at right angles so as to provide a portion 20 to lie along the rear face of the cross-piece and an anchorage portion 21 to lie against the end of the cross-piece and against the side wall of the car, projecting beyond and forwardly of the end of the cross-piece far enough to enable it readily to be attached to the side wall of the car without interference from the beam or the load. The end regions of the clip may be perforated for the ready application of nails or screws,—those applied through portion 20 for attaching the bracket to the cross-beam and those applied through portion 21 for anchoring the bracket to the car wall. Intermediate its ends the bracket is provided with an opening 22 through which the tension member 13 may be passed and lie.

Figs. 5 and 6 show an effective anchorage clip 25 for conveniently fastening the ends of the tension member 13 to the side walls of the car. This anchorage clip is merely a small flat metal plate having holes 26 in opposite ends for fastening screws or nails for attaching it in place on the car side wall and a slot 27 for the passage of an end of the tension binder. In application, one end of the tension member 13 is passed through slot 27 and then the clip is rotated until it is encircled one or more times, as desired, by the tension member. Now, when the clip is attached to the car walls by nails or screws passing through holes 26 and into the car wall, the end of the tension member will be securely anchored to the car wall.

In preparing an end of the car for its load unit—for example, a plurality of crates—the anchor-ends of the binder sections 13' and 13" are attached to the opposite car walls behind (i. e., toward the car end) the vertical plane in which the cross-beam 11 will lie when the beam rests against the front or doorway faces of the constituents of the load unit. This anchorage may be effected by the method and arrangement heretofore described and shown in Figs. 4 and 5. The binder sections are then trained along the side walls of the car toward the doorways so as to be out of the way during the loading. For example, the binder sections may be temporarily secured to the car walls by staples and the ends thereof passed out of the doorways and temporarily retained in a convenient location and out of the way, say by looping them through or around the lock members of the open doors (for one car end) and the door jambs (for the other car end).

The crates constituting the load unit for one end of the car are now moved in and closely packed together until the end is filled to the desired line toward the doorway.

When one end of the car is filled, the cross-beam to be associated therewith and to act as a gate therefor is positioned. This is done by sliding the free ends of the two binder sections 13' and 13" through the openings 22 of the reaction-brackets 15 secured to opposite ends of the beam,—care being taken that when the beam is in position against the load the portion 21 of each bracket, which is to be secured to the car wall, projects forwardly so that the anchoring nails or screws may be readily applied therethrough and forced into the car wall. The binder sections 13' and 13" are now trained over struts 12, the ends thereof are overlapped and tension, preferably by means of a suitable tool, is applied thereto. During the application of tension, the seating of the cross-beam tightly against the front face of the load unit is accompanied by the sliding of the reaction-brackets upon the binder. When the cross-beam is pressing against the front face of the load unit with considerable pressure—but, of course, in amount insufficient to crush the crates—the reaction-brackets are nailed or screwed to the car wall so as to anchor them and the ends of the cross-beam in fixed relation to the car wall.

Now further tension is put upon the binder until, through the thrust imparted by the struts 12, the central region of the cross-beam is tightly against the load. Then the overlapping ends of the binder sections 13' and 13" are joined together by a suitable tension-resisting joint and the tensioning tool is removed.

When completed as thus described, the load comprises a compactly assembled and held group or unit of crates filling an end of the car to the extent desired or permitted and with the retaining pressure—or reaction to impacts—substantially uniformly distributed across the face thereof from side to side of the car. The beam serves as a gate to retain the unit and its constituents tightly in place and the tension binder acting thereon in cooperation with the struts serves to prevent the gate from bowing under the tension of the binder. Furthermore, the relatively rigid cross-beam, over the ends of which the binder is trained, prevents the tensioned binder from subjecting the load, particularly at its forward corners, to excessive stresses acting substantially parallel to the length of the cross-beam. The cross-beam also prevents the tensional binder from pulling the reaction-brackets from the car walls.

At destination when it is desired to remove the load, the binders 13 are cut, the nails or screws holding the reaction-brackets are withdrawn, the gate is removed, and the load is free for unloading.

Having thus illustrated an embodiment and explained the nature of my invention, what I claim and desire to secure by United States Letters Patent is as follows:

1. A brace for retaining a group of articles tightly in one end of a box car comprising a cross-beam extending across the car from wall to wall to retain a group of articles therebehind, a bracket secured at each end of the cross-beam to attach the cross-beam immovably to opposite car walls, a strut projecting outwardly from the mid region of the cross-beam, and a flexible tension member anchored at opposite ends to the opposite car walls rearwardly of the cross-beam and trained over the ends of the cross-beam and across the car in front of the cross-beam and against the strut thereof.

2. A brace for retaining a group of articles tightly in one end of a box car comprising a cross-beam extending across the car from wall to wall in front of a group of articles therebehind in an end of the car, means for attaching the ends of the cross-beam immovably to the opposite car walls, a strut projecting forwardly from the mid region of the cross-beam, and a flexible tension member having its opposite ends anchored to opposite car walls rearwardly of the cross-beam and between anchorages lying over the ends of the cross-beam and across the car in front of the cross-beam and against the strut thereof.

3. A gate for retaining a group of articles tightly in one end of a car comprising a cross-beam extending across the car from wall to wall in front of and against the face of a group of articles filling one end of the car, means for anchoring the ends of the cross-beam immovably to opposite walls of the car, a strut projecting outwardly from the cross-beam in the mid region thereof, and a flexible metallic tension member anchored at opposite ends to opposite car walls behind the plane of the cross-beam and between its anchorages being trained in the plane of the cross-beam over the ends of the cross-beam and along the front of the same over the strut.

4. A gate for retaining a group of articles tightly in one end of a car comprising a cross-beam extending across the car from side wall to side wall in front of and against the face of a group of articles occupying one end of the car, a reaction-bracket fixed to each end of the cross-beam and to the corresponding car wall, each bracket having a hole therethrough adjacent the end of the cross-beam, a strut projecting outwardly from the cross-beam intermediate its ends, and a flexible metallic tension member anchored at opposite ends to the car wall behind the ends of the cross-beam and between its anchorages passing over the ends of the cross-beam through the holes in the reaction-brackets and across the car in front of and in the plane of the cross-beam and over the strut.

JENNESS B. FREAR.